(12) United States Patent
Watanabe

(10) Patent No.: US 6,169,758 B1
(45) Date of Patent: Jan. 2, 2001

(54) LASER OUTPUT DETECTOR

(75) Inventor: Shinji Watanabe, Takatsuki (JP)

(73) Assignee: O.M.C. Co., Ltd., Takatsuki (JP)

( * ) Notice: Under 35 U.S.C. 154(b), the term of this patent shall be extended for 0 days.

(21) Appl. No.: 09/294,009

(22) Filed: Apr. 19, 1999

(30) Foreign Application Priority Data

Apr. 20, 1998 (JP) .................................................. 10-126813

(51) Int. Cl.[7] .............................. H01S 3/08; B23K 26/00
(52) U.S. Cl. ............................. 372/108; 372/20; 372/38; 372/29; 372/109; 372/10; 372/58; 219/121.6; 219/121.61; 219/121.62
(58) Field of Search .................................... 372/9, 20, 25, 372/29, 38, 31, 108, 109, 10, 55, 58; 219/121.6, 121.61, 121.62

(56) References Cited

U.S. PATENT DOCUMENTS

| | | |
|---|---|---|
| 5,050,174 * | 9/1991 | Wani et al. .............................. 372/20 |
| 5,132,528 * | 7/1992 | Barton et al. ..................... 372/108 X |
| 5,339,324 * | 8/1994 | Eguchi et al. .......................... 372/29 |
| 5,636,232 * | 6/1997 | Goto ........................................ 372/21 |
| 6,002,706 * | 12/1999 | Staver et al. .......................... 372/108 |

* cited by examiner

Primary Examiner—Brian Healy
(74) Attorney, Agent, or Firm—Oblon, Spivak, McClelland, Maier & Neustadt, P.C.

(57) ABSTRACT

A laser output detector is provided which comprises: a convertor unit having a light sampling port to be located adjacent a projecting portion of a laser beam projector for sampling a fraction of a convergent portion of a laser beam projected from the laser beam projector or a fraction of a non-convergent portion of the laser beam outside the convergent portion of the laser beam, and adapted to convert the sampled laser beam fraction into an electrical signal; and a detection circuit for computing the energy amount of the projected laser beam on the basis of the electrical signal outputted from the convertor unit.

11 Claims, 19 Drawing Sheets

LASER OUTPUT DETECTOR

BACKGROUND OF THE INVENTION

1. Field of the Invention

The present invention relates to a laser output detector of dry type which is capable of continuously determining a laser output through computation even during a laser beam machining process.

2. Description of the Prior Art

Various laser output measuring apparatuses have been hitherto known, one example of which is a water-cooled laser output measuring device which includes a sensor disk disposed in the center of the water-cooled vessel and adapted to absorb an incident laser beam as much as possible and detect the energy amount of the laser beam. The laser output measuring device is placed under a laser beam projector for measurement of the laser output. The laser beam projected from the laser beam projector is received by the sensor disk, which absorbs the laser beam as much as possible and converts the laser beam into an electrical signal for determination of the energy amount of the laser beam.

The laser output measuring device of this type has the following drawbacks:

(1) While the measurement accuracy is high because the projected laser beam is virtually entirely absorbed by the sensor disk, it is necessary to locate the measuring device at a work piece machining position so that the work piece machining should be stopped when the measurement is to be performed.

(2) Since the measuring device is of a water-cooled type, a cooler is required for keeping the temperature of the cooling water constant. Therefore, the device has a large and complicated construction and requires higher costs, whereby the number of laser output measuring devices relative to the number of the laser machining apparatuses is inevitably limited.

It is a first object of the present invention to provide a laser output detector which is capable of directly detecting a laser beam projected from a laser beam projector for continuous measurement of a laser output even during a laser machining process. In other words, such a laser output detector is capable of constantly performing the measurement of the laser output, while ensuring continuous laser machining.

It is a second object of the present invention to provide a laser output detector of a simplified construction which can be fabricated at lower costs and employed as an essential component for a laser machining apparatus.

SUMMARY OF THE INVENTION

In accordance with the present invention, there is provided a laser output detector adapted to directly sample laser energy from a laser beam projected from a laser beam projector for measurement of a laser output, the laser output detector comprising: a convertor unit having a light sampling port to be located adjacent a projecting portion of the laser beam projector for sampling a fraction of a convergent portion of the projected laser beam or a fraction of a non-convergent portion of the laser beam outside the convergent portion of the laser beam, and adapted to convert the sampled laser beam fraction into an electrical signal; and a detection circuit for computing the energy amount of the projected laser beam on the basis of the electrical signal outputted from the convertor unit.

The laser beam is focused on a surface of a work piece by means of an optical system of the laser beam projector for welding, cutting or engraving the work surface.

Even if the fractional laser beam is sampled from the convergent portion of the laser beam to be used for the laser machining, the energy amount of the fractional laser beam accounts for a very small proportion of the total amount of the laser energy, so that the sampling does not profoundly affect the machining performance. The amount of the sampled energy is linearly proportional to the energy amount of the projected laser beam (which is, in practice, represented by a value obtained through the conversion to an electrical signal and the computation on the basis of the electrical signal), and equals to 1/n of the energy amount of the projected laser beam.

In other words, the energy amount of the projected laser beam can be estimated by multiplying the energy amount of the sampled laser beam fraction by n.

As shown in FIG. 2, the energy level of the laser beam progressively decreases as a distance from the center axis of the convergent portion of the laser beam increases toward the periphery thereof. The laser beam may be sampled at any position between the center axis and the periphery of the laser beam for the detection of the energy. However, sampling from the central portion of the laser beam is not preferred in terms of the machining efficiency, because an energy intensity at the central portion is excessively high thereby resulting in a great energy loss.

Since the central portion of the convergent portion of the laser beam is mainly used for the laser machining, the peripheral portion thereof makes little contribution to the machining. Therefore, sampling from the peripheral portion of the laser beam for the measurement exerts no adverse influence on the machining.

Thus, the energy amount of the convergent portion of the laser beam projected from the laser beam projector to be used for the machining can be determined for every laser shot on a real time basis by converting the sampled laser beam fraction into an electrical signal, computing the energy amount of the laser beam fraction on the basis of the electrical signal and multiplying the energy amount of the laser beam fraction by a predetermined multiplication factor. Then, the energy amount thus determined is displayed on a display unit. The displaying method will be described later in detail.

DETAILED DESCRIPTION OF THE PREFERRED EMBODIMENTS

Figure 1:
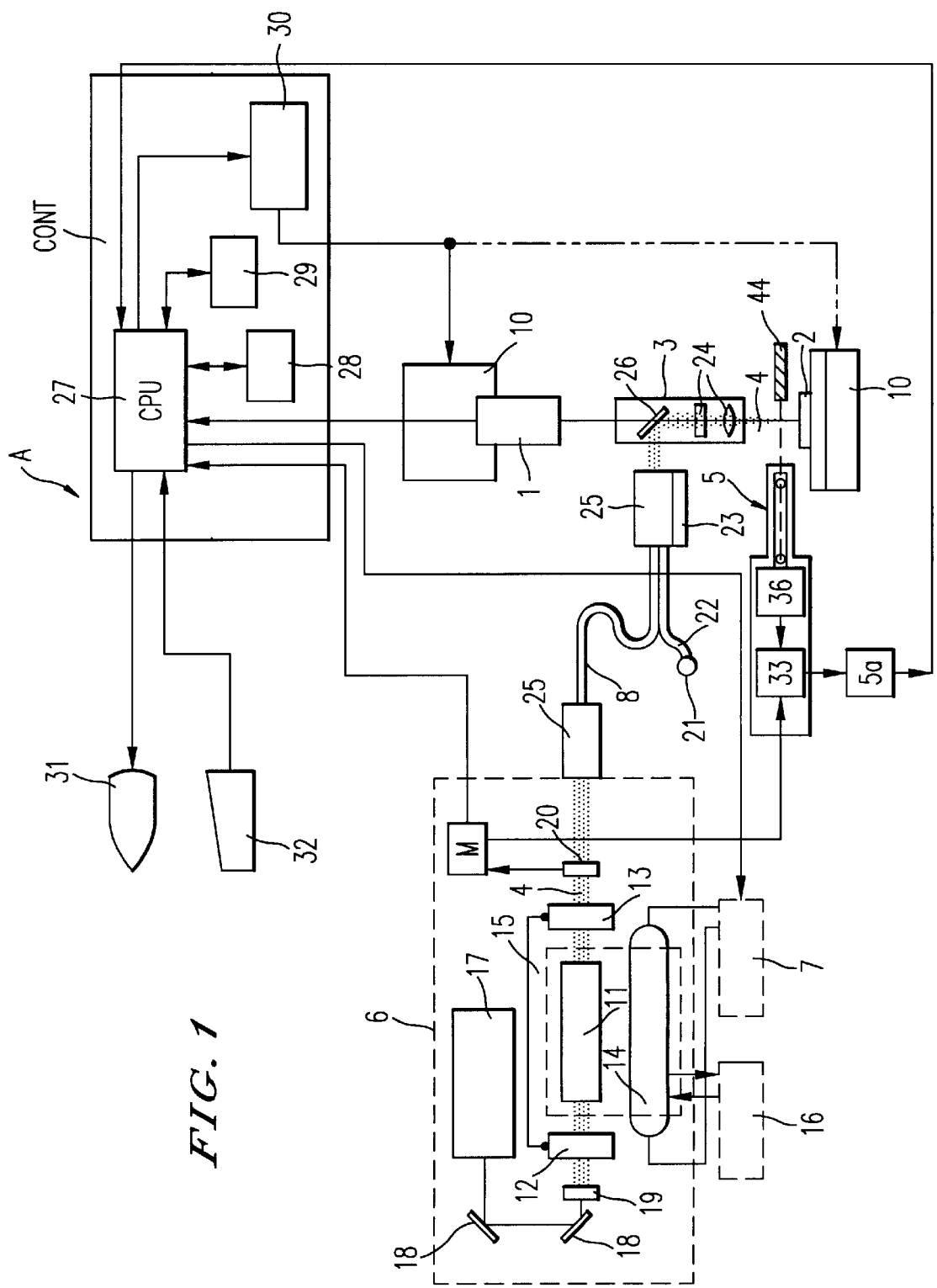
FIG. 1 is a block circuit diagram of an apparatus according to the present invention.

Embodiments of the present invention will hereinafter be described with reference to the attached drawings. FIG. 1 is a block circuit diagram of a laser machining apparatus A according to the present invention. A laser unit 6 comprises an excitation lamp 14 for emitting light into a YAG rod 11, a power source 7 for energizing the excitation lamp 14, a housing 15 accommodating therein the excitation lamp 14 and the YAG rod 11, a cooler 16 for cooling the inside of the housing 15, a He-Ne laser 17 for optical axis alignment, reflection mirror members 18 for deflecting a light beam emitted from the He-Ne laser 17, a total reflection mirror member 19 disposed between one of the reflection mirror members 18 and a shutter 12 (shown on the left side in FIG. 1), and an output mirror member 20 disposed downstream of a shutter 13.

A laser beam 4 is generated by exciting the light by continuous oscillation, pulse oscillation, Q-switch pulse oscillation or single mode, and outputted from the output mirror member 20. A part of the light leaking out of the output mirror member 20 is detected by a monitor M, and inputted into a CPU 27 in the form of an electrical signal. Then, the energy amount of the emitted laser beam at the output mirror member 20 is computed.

A laser beam projector 3 incorporates therein an optical system 24 including an optimum combination of lenses such as a single lens, a doublet lens, a triplet lens, a planoconvex lens and a cylindrical lens. The laser unit 6 is connected to the laser beam projector 3 via a coupler 25 by a laser transfer member 8 (e.g., an optical fiber) so that the laser beam 4 can be inputted into the laser beam projector 3.

Figure 2:
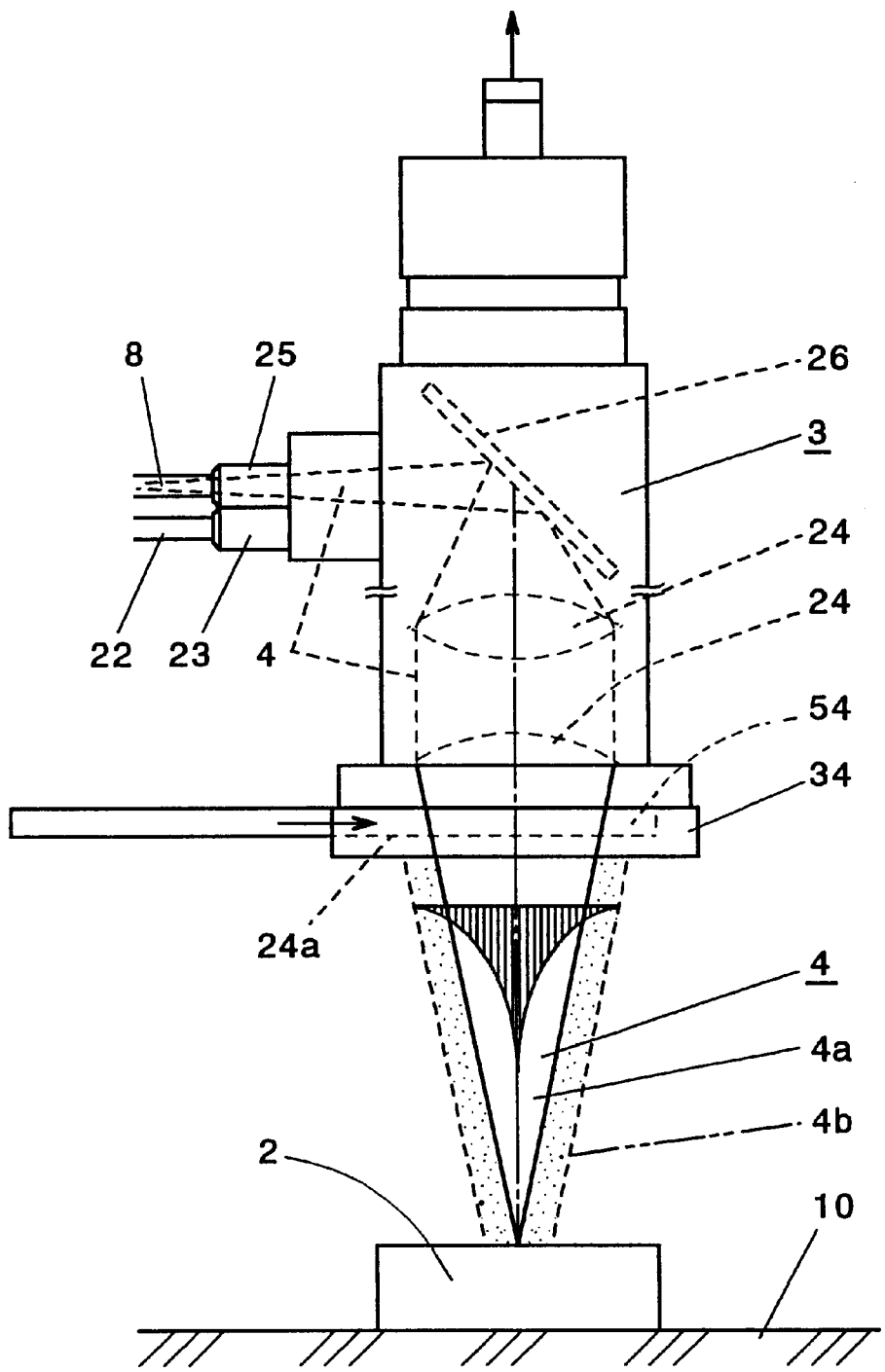
FIG. 2 is an enlarged front view illustrating a laser beam projector and its surroundings according to the present invention.

An aperture member 34 is attached on an objective side of the laser beam projector 3 as shown in FIG. 2, and a protective glass 54 is detachably fitted in the aperture member 34 to protect an objective lens of the optical system 24. In this embodiment, the lower surface of the protective glass 54 serves as an objective surface 24a of the laser beam projector 3. Where the protective glass 54 is not employed, the lower surface of the objective lens serves as the objective surface.

The aperture member 34 functions as an aperture stop to control the passage of the laser beam 4. The aperture member 34 is, for example, comprised of a glass substrate and a translucent film bonded thereon, so that the amount of the laser beam 4 passing through the aperture member 34 is limited to a constant level.

A pattern recognition device 1 which is adapted to analyze an image of a surface of a work piece 2, for example, by a CCD camera and convert the image into digital electrical signals is connected to the CPU 27 in a main control unit. A pattern image of the work piece 2 taken into the pattern recognition device 1 is converted into digital electrical signals, which are in turn inputted into the CPU 27.

A light source 21 serves for illumination of the work piece. Light emitted from the light source 21 is inputted into the laser beam projector 3 via a light input terminal 23 disposed adjacent the coupler 25 through an optical fiber cable 22. The incident light is reflected on a transmissive total reflection member 26, and passes through the optical system 24 of the laser beam projector 3 thereby to be projected onto the work piece 2 for illumination thereof.

The laser beam 4 inputted into the laser beam projector 3 via the coupler 25, the light beam for the work piece illumination and the laser beam for the optical axis alignment are totally reflected on the transmissive total reflection member 26. The paths of these light beams coincide with the axis of the light to be inputted through the transmissive total reflection mirror member 26 into the pattern recognition device 1. Therefore, a position at which the laser beam 4 from the laser beam projector 3 is focused can accurately be detected, and the machining state of the work piece can be displayed on a CRT 31.

The laser beam 4 is focused on the surface of the work piece by the optical system 24 of the laser beam projector 3 for welding, cutting or engraving of the work piece. The energy level of the laser beam 4 progressively decreases at a certain rate as a distance from the center axis of a convergent portion 4a of the laser beam 4 increases toward the periphery thereof.

Further, the laser beam 4 projected from the laser beam projector 3 is not perfectly converged at a single point as a single wavelength beam, but a very small fraction thereof is left non-convergent around the convergent portion 4a. This laser beam fraction is herein referred to as a non-convergent portion 4b. As shown in FIG. 2, the energy intensity of the non-convergent portion 4b also progressively decreases as a distance outwardly apart from the periphery of the convergent portion 4a increases. The non-convergent portion 4b is present as an energy zone which has an energy amount correlated with the energy amount of the laser beam 4 projected from the laser beam projector 3.

Figure 14:
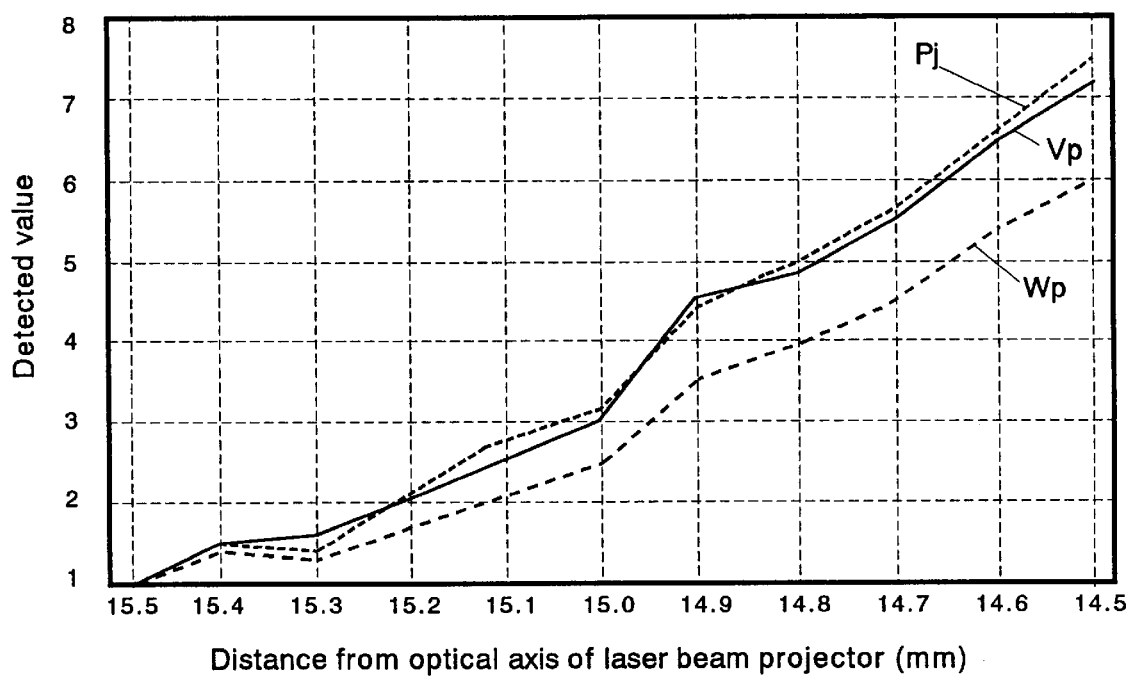
FIG. 14 is a display image showing a relationship between a distance from a center axis of a laser beam and a detect value.

Referring to FIG. 14, the ordinate and the abscissa represent the detected energy level of the non-convergent portion 4b and the distance (mm) from the optical axis of the laser beam projector 3, respectively. In FIG. 14, the solid line graph shows a change in the detected voltage (Vp), the broken line graph shows a change in the detected heat amount (=detected power (joule)), and the dot-and-dash line graph shows a change in the peak value (Wp) of the detected power. As shown, the detected values decrease as the distance from the optical axis of the laser beam projector 3 increases. Although the measurements were obtained over a distance range between 14.5 mm and 15.5 mm from the optical axis, it is expected that the values progressively increase toward the optical axis.

Figure 3:
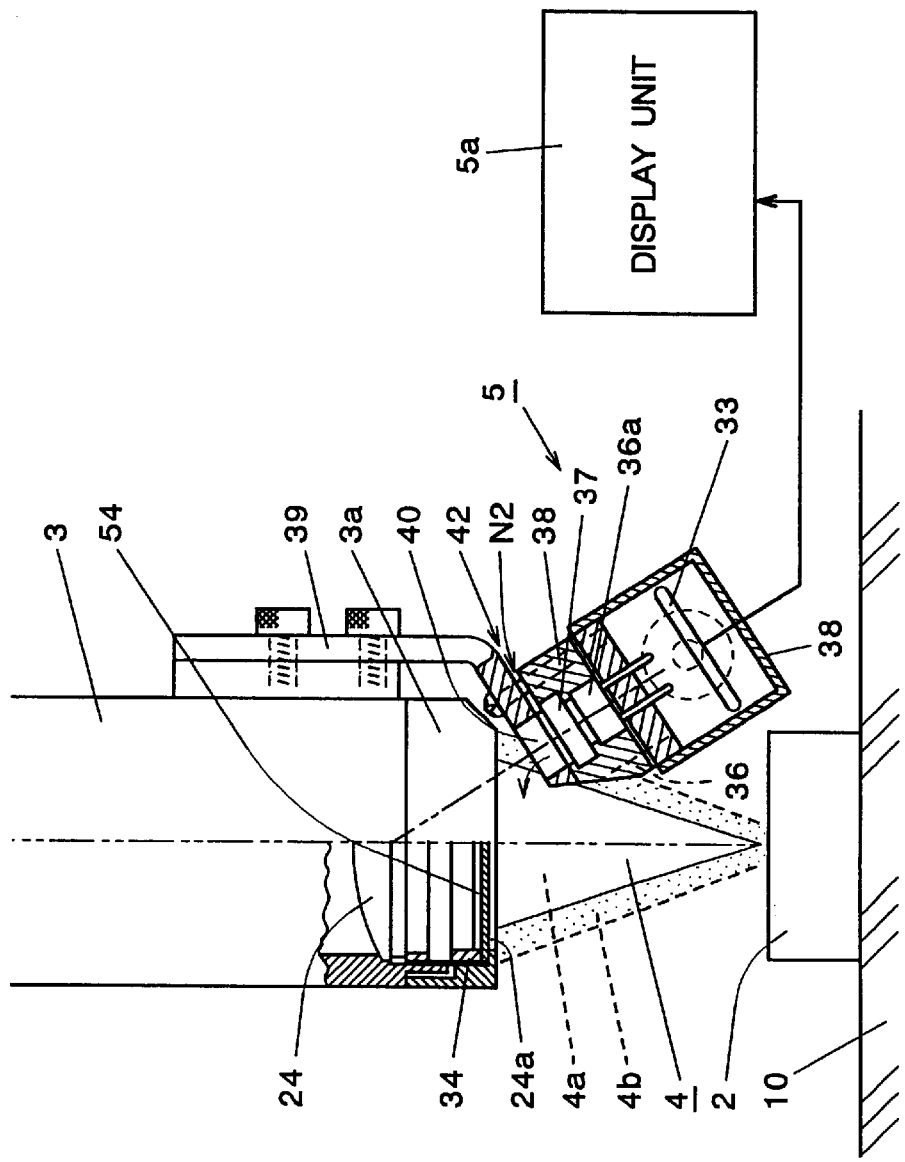
FIG. 3 is a partially cutaway side view of a laser beam projector according to a first embodiment of the present invention.

Next, an explanation will be given to laser output detecting methods. A first method is such that a very small fraction of the laser beam 4 projected from the laser beam projector 3 is sampled from the convergent portion 4a thereof as shown in FIG. 3. The sampling may be carried out at any position between the center and the periphery of the convergent portion 4a, but the sampling at the center portion is not preferred in terms of machining efficiency because the energy intensity is too high at the center portion resulting in a greater energy loss.

Since the center portion of the convergent portion 4a of the laser beam 4 is mainly used for the laser machining, the peripheral portion of the laser beam 4 makes little contribution to the machining. Therefore, the sampling from the peripheral portion of the laser beam 4 for the measurement exerts no adverse influence on the machining.

The energy amount of the convergent portion 4a of the laser beam 4 projected from the laser beam projector 3 for the machining can be determined for every laser shot on a real time basis by converting the sampled laser beam fraction into an electrical signal, computing the energy amount of the laser beam fraction on the basis of the electrical signal, and multiplying the energy amount of the laser beam fraction by a predetermined multiplication factor.

A second method is such that the non-convergent portion 4b (schematically illustrated as a dotted area defined by broken lines) of the laser beam 4 projected from the laser beam projector 3 is entirely or partially sampled outside the convergent portion 4a of the laser beam 4. In this embodiment, the non-convergent portion 4b of the laser beam 4 is partially sampled. That is, a fraction of the laser beam 4 is present as a non-convergent energy zone around the convergent portion 4a. In this non-convergent portion 4b, the energy intensity progressively decreases as a distance outwardly apart from the periphery of the convergent portion 4a increases, but has a certain relation with the energy intensity of the laser beam 4 projected from the laser beam projector 3. Therefore, the energy intensity of the projected laser beam 4 can be determined by sampling a laser beam fraction from the non-convergent portion 4b which is not used for the laser machining but for the measurement of the energy output.

An explanation will next be given to the if construction of a laser output detector 5 which performs the first and second methods described above. Basically, the laser output detector 5 is disposed adjacent a projecting portion 3a of the laser beam projector 3, and adapted to sample a very small fraction of the convergent portion 4a of the projected laser beam 4 or at least a fraction of the non-convergent portion 4b of the laser beam 4 for the measurement of the laser output. As described above, exemplary sampling methods are: (1) direct sampling; (2) sampling by a reflector member 44; and (3) sampling by an optical fiber 28. The direct sampling method (1) is employed in a first embodiment.

Since the method (1) to (3) employ the same laser output detector 5, an explanation will first be given to the laser output detector 5 and then to the methods of sampling the laser beam 4.

The laser output detector 5 includes a cover 38 formed with a light sampling port 40, a laser filter 37 (in this case, a filter for YAG laser, but not limited thereto) fitted in an entrance of the light sampling port 40, a conversion device 36a such as a laser PIN photodiode provided behind the laser filter 37 and adapted to convert light into an electrical signal, a housing 38a connected to the cover 38, and a detection circuit 33 accommodated in the housing 38a and adapted to compute the energy amount of the projected laser beam 4 on the basis of the electrical signal outputted from the conversion device 36a. A display unit 5a is connected to the detection circuit 33 of the laser output detector 5.

Figure 15:
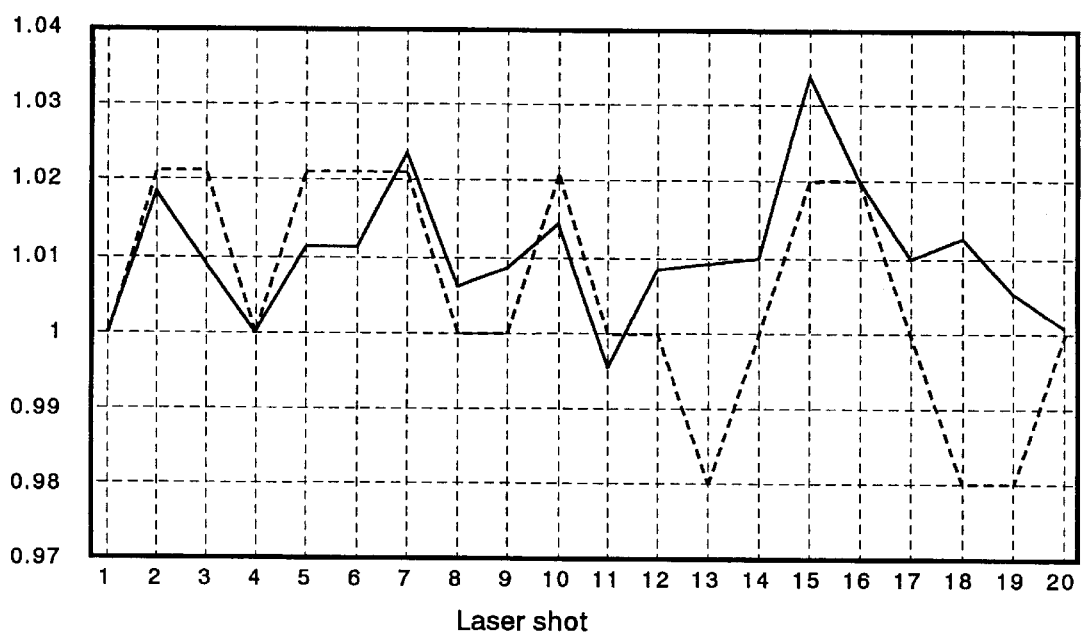
FIG. 15 is a display image showing a comparison between a value detected by a laser output detector of the present invention and a value detected by a monitor.
Figure 16:
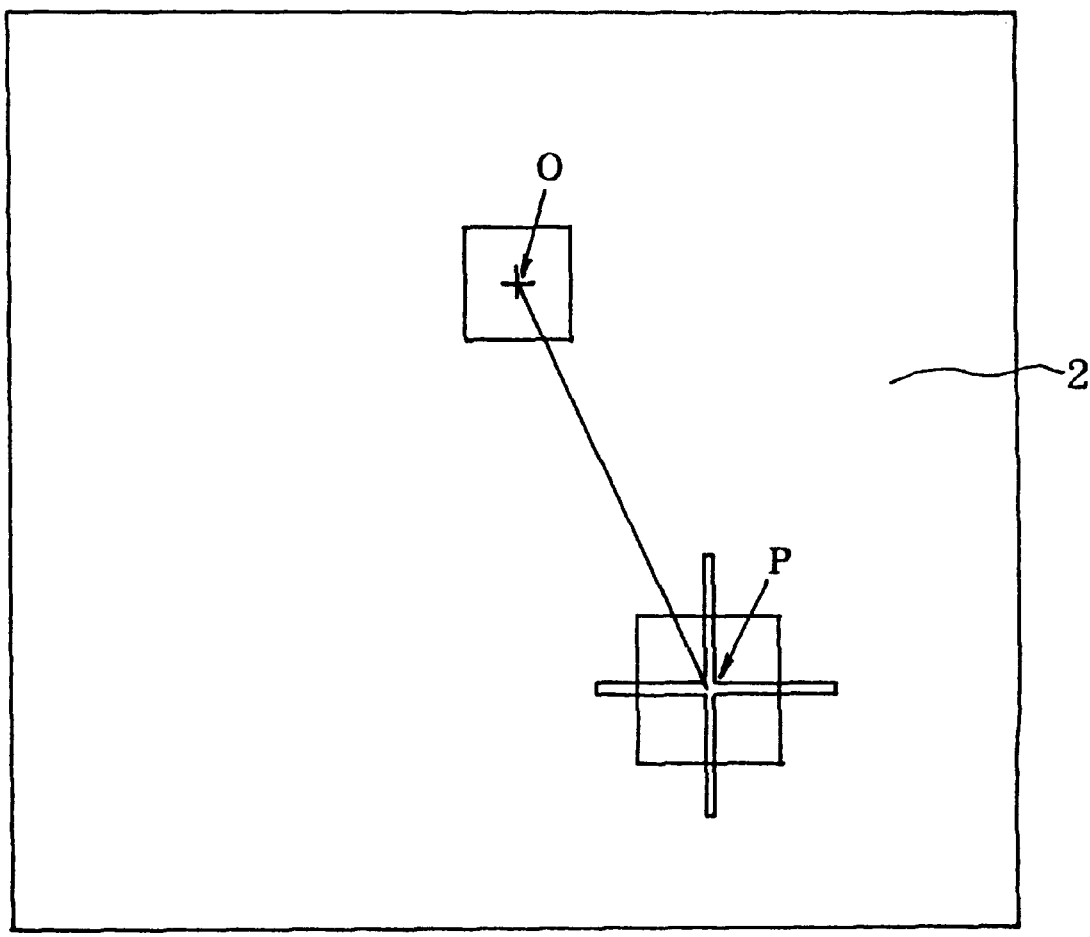
FIG. 16 is a display image for explaining a process for computing X-Y coordinates of a machining position with respect to an origin through pattern recognition.
Figure 17:
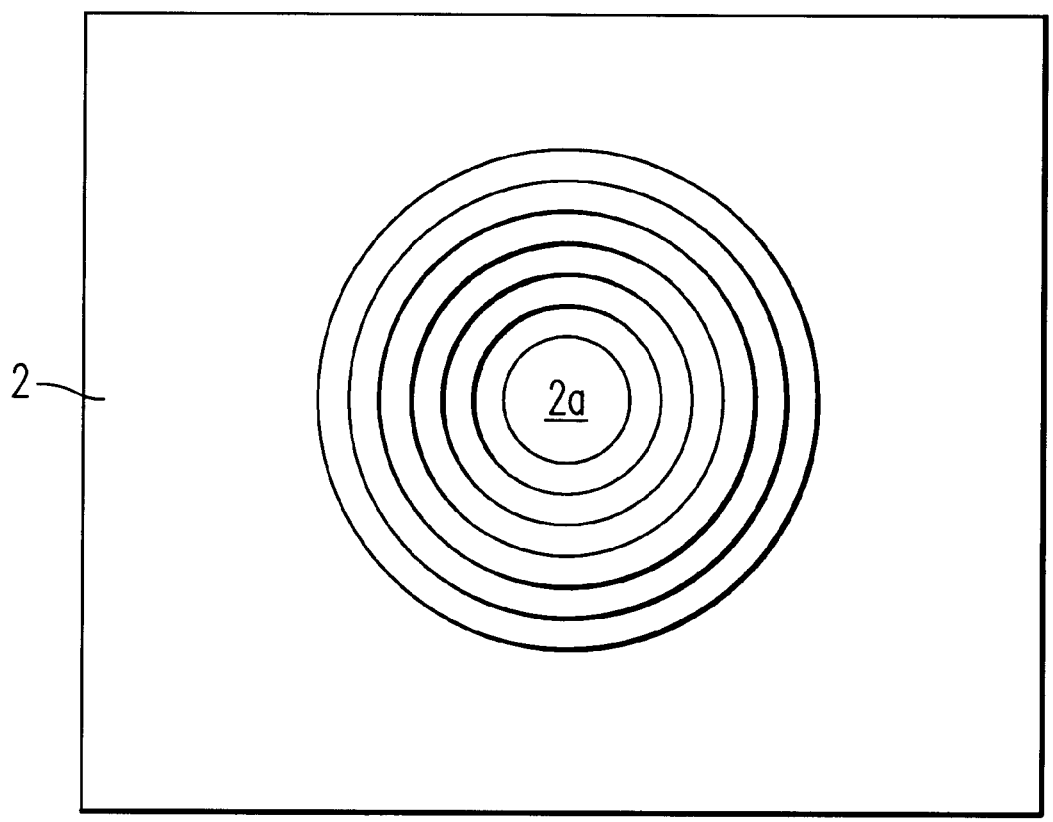
FIG. 17 is a pattern recognition display image showing a machining trace obtained by one laser shot in accordance with the invention.
Figure 18:
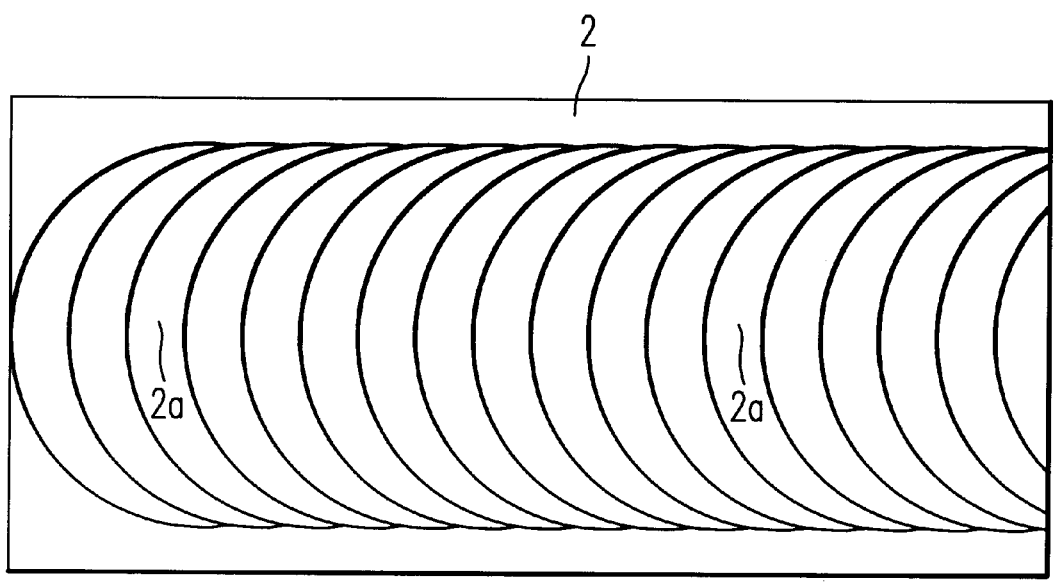
FIG. 18 is a pattern recognition display image showing a beam welding trace obtained by sequential laser shots in accordance with the invention.
Figure 19:
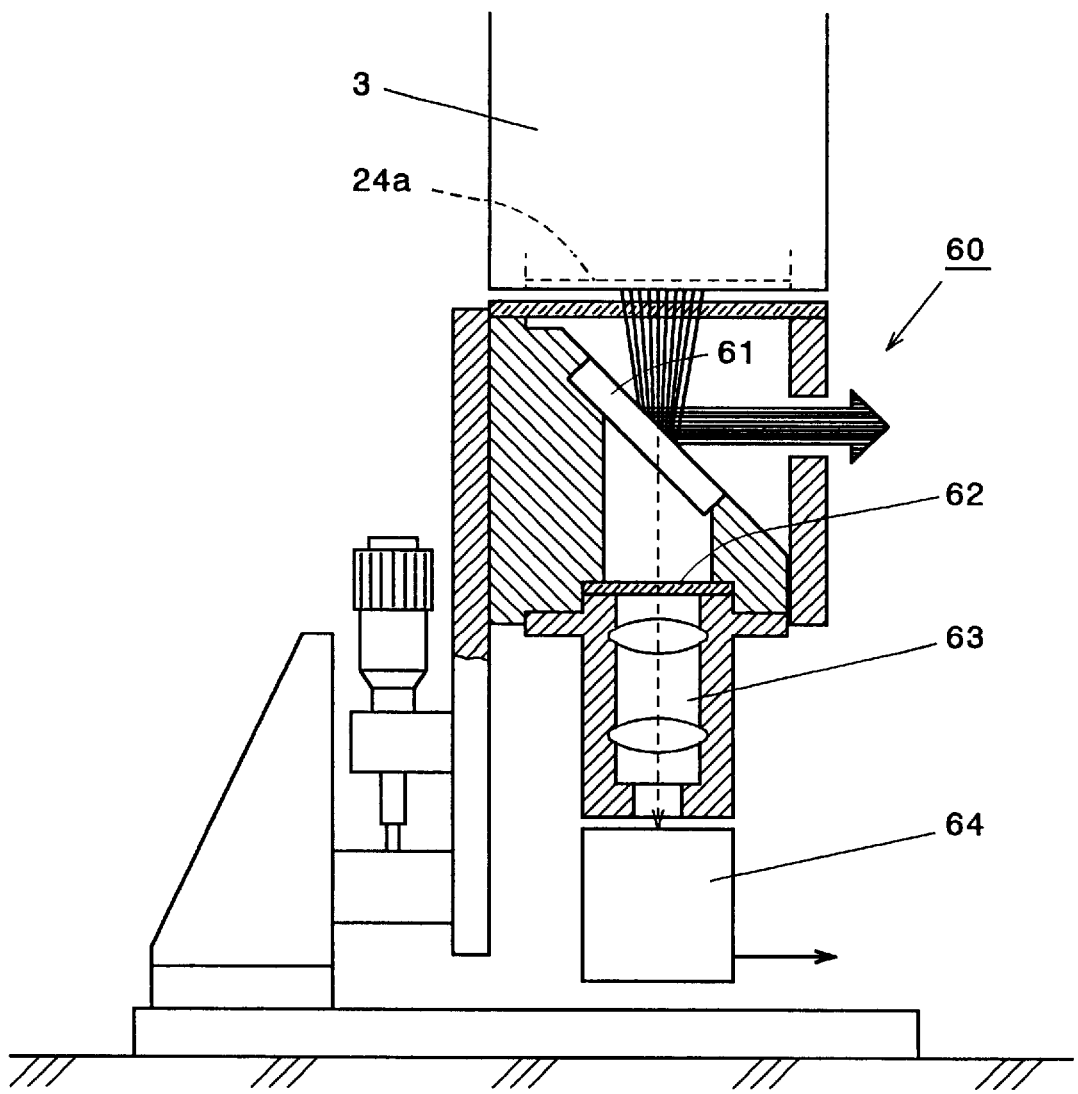
FIG. 19 is a partially cutaway side view illustrating a dry-type calibrator for the laser output detector according to the present invention.

The detection circuit 33 also receives an electrical signal inputted from the monitor M. The electrical signal from the monitor M can be displayed along with the electrical signal from the conversion device 36a for comparison on the display unit 5a. Detected signal levels are shown in FIG. 15.

The cover 38, the laser filter 37 and the conversion device 36a constitute a convertor unit 36. It is noted that the laser filter 37 is detachable so as to be optionally provided or replaced.

An explanation will next be given to: (1) the method of direct sampling; (2) the method of sampling by the reflector member 44; and (3) the method of sampling by the optical fiber 28. FIG. 3 illustrates the first embodiment which employs the direct sampling method (1). The light sampling port 40 of the laser output detector 5 is opposed to the objective surface 24a of the laser beam projector 3, so that a fraction of the convergent portion 4a of the projected laser beam 4 or a fraction of the non-convergent portion 4b of the laser beam 4 is sampled through the light sampling port 4. The conversion device 36a converts the sampled laser beam fraction into an electrical signal, and outputs the electrical signal. The energy intensity of the projected laser beam 4 is computed on the basis of the outputted electrical signal by the detection circuit 33 as described above, and displayed on the display unit 5a. The computed energy intensity is typically displayed in numeric representation, but may be displayed in any proper form such as a bar chart or a pie chart. It is noted that FIG. 3 shows a case where a fraction of the non-convergent portion 4b is sampled.

With reference to FIGS. 4(a) to 4(c) and 5, there will next be described a second embodiment which employs the sampling method (2) using the reflector member 44. In this embodiment, the laser output detector 5 is fixed to the laser beam projector 3 by means of a support 39, and the reflector member 44 is disposed opposite across the laser beam 4 from the laser output detector 5. Usable as the reflector member 44 are: (1) a rod which has a distal end beveled at a certain angle (typically 43°) with respect to the axis of the laser beam 4 and having a mirror-finished reflection surface 35 as shown in FIG. 4(a); (2) a rod which is provided with a prism 44a bonded to its distal end for reflecting light at a certain angle (typically 43°) as shown in FIG. 4(b); and (3) a rod which is provided with a mirror 44b bonded to its distal end at a certain angle (typically 43°) as shown in FIG. 4(c). The first rod is herein used as a typical example of the reflector member 44.

The reflector member 44 may be fixed to the laser beam projector 3, the cover 38 or the support 39, as long as the axis of light reflected thereby coincides with the optical axis of a light receiving surface of the convertor unit 36. In this embodiment, however, the reflector member 44 is attached to a sliding mechanism 9 in a movable manner.

The sliding mechanism 9 includes a stationary gear member 48, a holder 50 by which the stationary gear member 48 is fixed to the laser beam projector 3, a plate gear 48a attached to the stationary gear member 48, a depth adjuster 46 slidable parallel to the stationary gear member 48, a mirror holder 45 attached to the depth adjuster 46, and a handle 47 meshed with the plate gear 48a and adapted to be rotated for advancing and retracting the depth adjuster 46. A heater 45a is, as required, provided in the mirror holder 45 to heat the reflector member 44 for prevention of moisture condensation.

More specifically, by said heating, the condensation of atmospheric moisture on the reflection surface 35 of the reflector member 44 can be prevented which may otherwise occur to reduce the reflectivity of the reflection surface 35 when an inert gas such as nitrogen gas or argon gas is blown into a laser machining region to maintain an inert atmosphere. Thus, the laser output detection can stably be performed.

Further, a nozzle 41 of a truncated cone shape (or a cylindrical shape) is provided on the objective side of the laser beam projector 3 for prevention of leakage of the laser beam 4.

The nozzle 41 is formed with a small hole 43a through which the reflector member 44 is inserted and retracted, a reflected light passage hole 43b through which the light reflected by the reflector member 44 passes, and an optional purge gas supplying hole 42. The reflected light passage hole 43b is located in a diametrically opposite position with respect to the small hole 43a.

The reflector member 44 is inserted through the small hole 43a into the nozzle 41 by operating the handle 47, and stopped at an appropriate depth. Then, a purge gas is supplied into the nozzle 41, as required, to form an inert atmosphere within the nozzle 41. The purge gas slowly flows out of a lower opening of the nozzle 41 to cover a portion of the work piece 2 to be machined.

Figure 4:
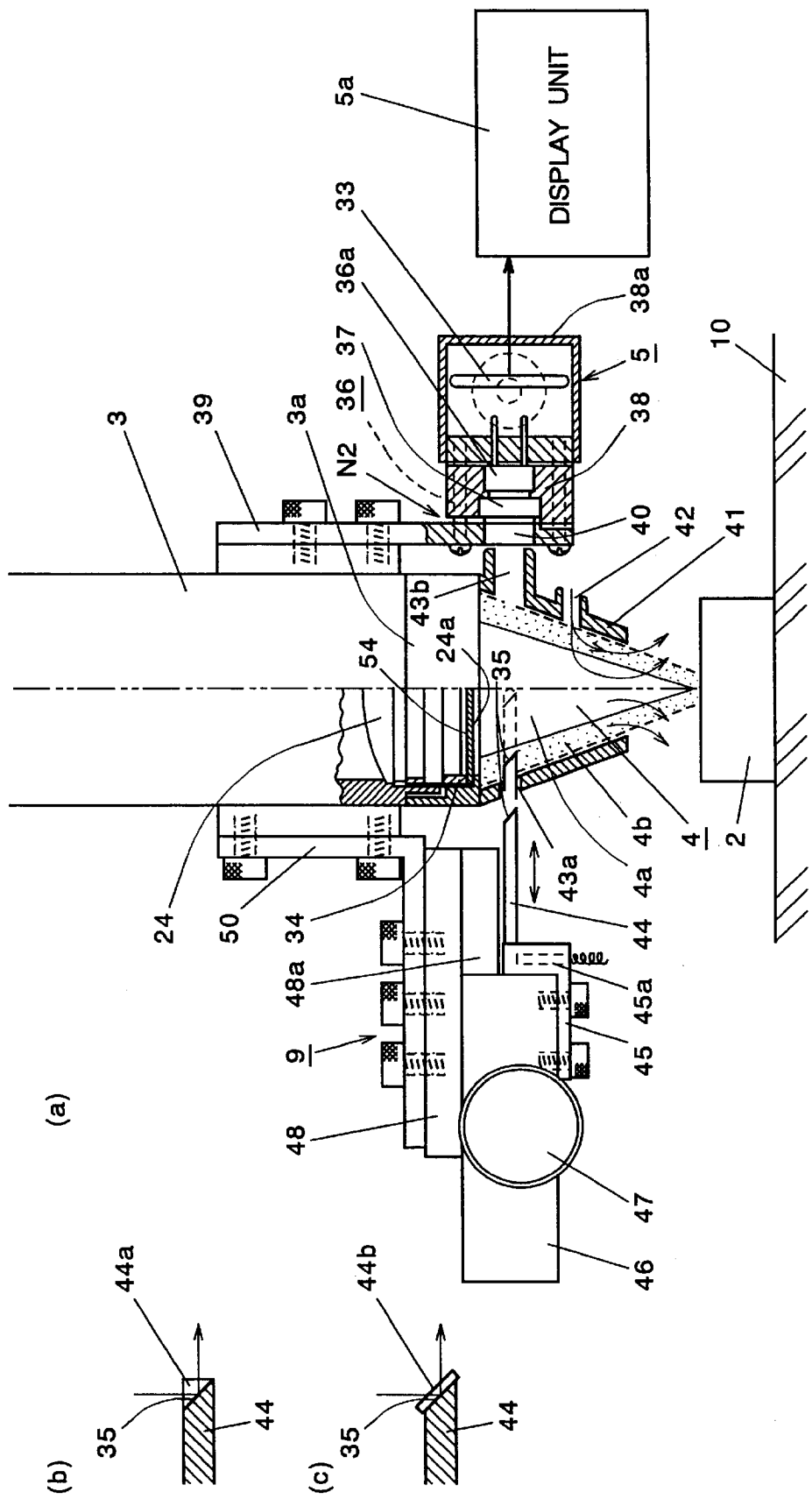
FIG. 4(a) is a partially cutaway side view of a laser beam projector according to a second embodiment of the present invention, and FIGS. 4(b) and 4(c) each illustrate a reflector member.
Figure 5:
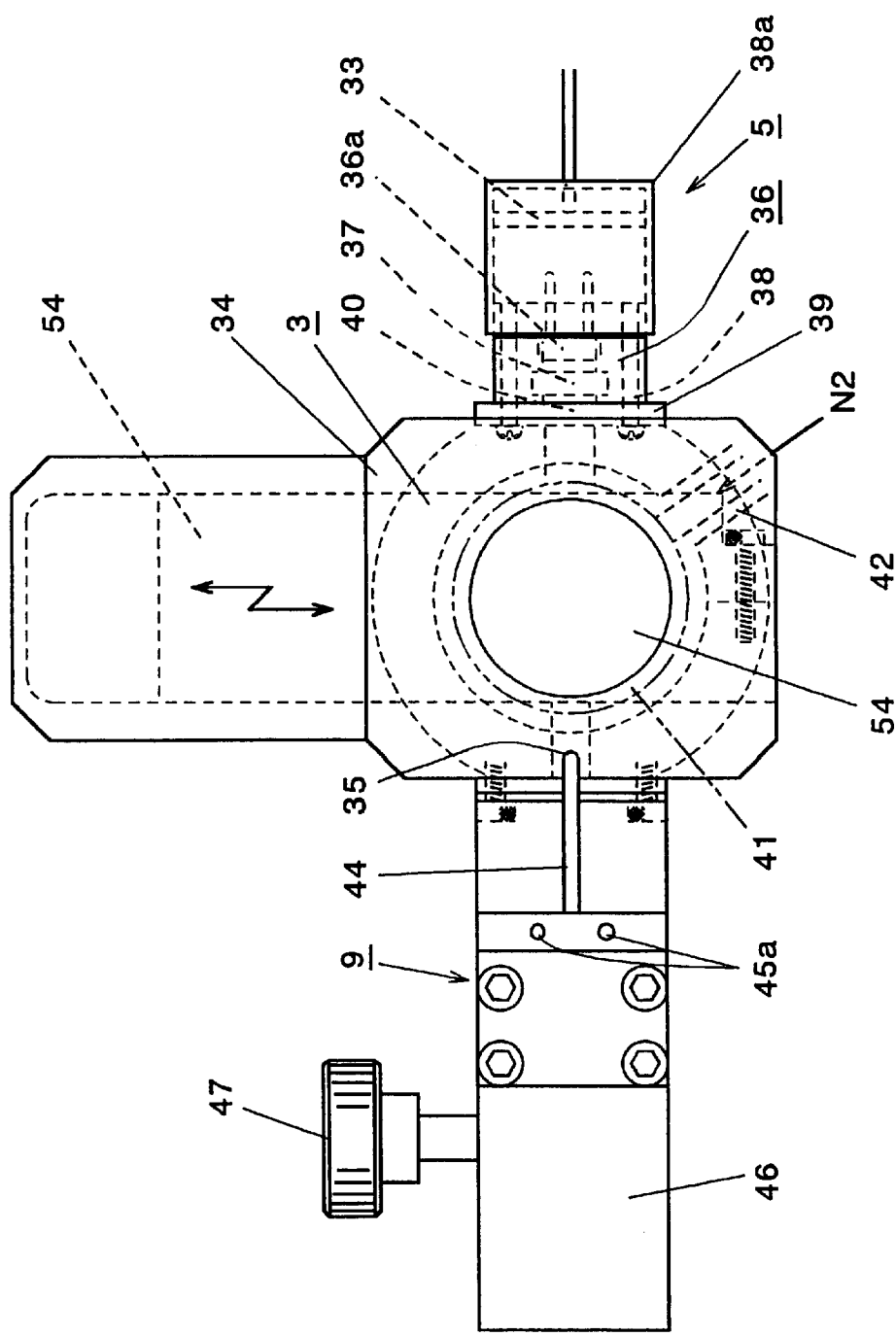
FIG. 5 is a bottom view of the laser beam projector shown in FIG. 4(a)

When the laser beam 4 is projected in this state, a very small fraction of the convergent portion 4a of the laser beam 4 or a fraction of the non-convergent portion 4b of the laser beam 4 impinges on the reflection surface 35 of the reflector member 44 thereby to be reflected toward the light sampling port 40. Thus, the laser beam fraction is taken into the laser output detector 5 for sampling thereof. As described above, the conversion device 36a converts the sampled laser beam fraction into an electrical signal, and outputs the electrical signal. The energy intensity of the projected laser beam 4 is computed on the basis of the outputted electrical signal by the detection circuit 33, and displayed on the display unit 5a. The computed energy intensity is typically displayed in numeric representation, but may be displayed in any proper form such as a bar chart or a pie chart. It is noted that FIG. 4 shows a case where a fraction of the non-convergent portion 4b is sampled.

When the laser beam 4 is focused on the machining surface of the work piece 2, metal fume evolves at the focus position. The supply of the purge gas prevents the metal fume from intruding into the nozzle 41. More specifically, if the metal fume intrudes into the nozzle 41, the laser beam fraction to be taken into the laser output detector 5 may be scattered, or the reflection surface 35 of the reflector member 44 may be fogged by deposition of the metal fume. The purging prevents these inconveniences to prevent a reduction in the light reflection rate for stable laser output detection.

Further, the depth of the insertion of the reflector member 4 into the laser beam 4 can be changed by operating the handle 47, so that optimum conditions for the laser energy detection can readily be found.

Figure 6:
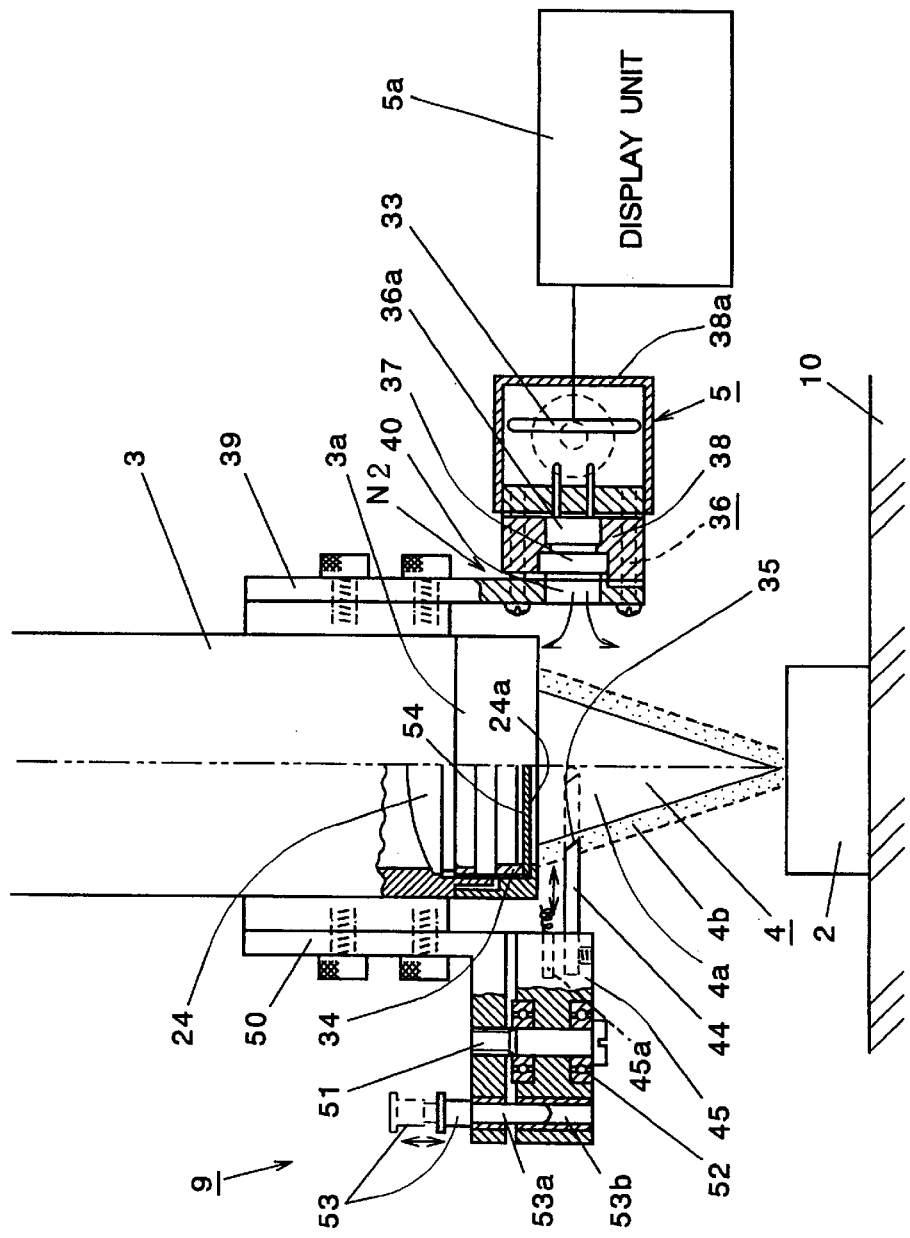
FIG. 6 is a partially cutaway side view illustrating a modification of the laser beam projector of the second embodiment.
Figure 7:
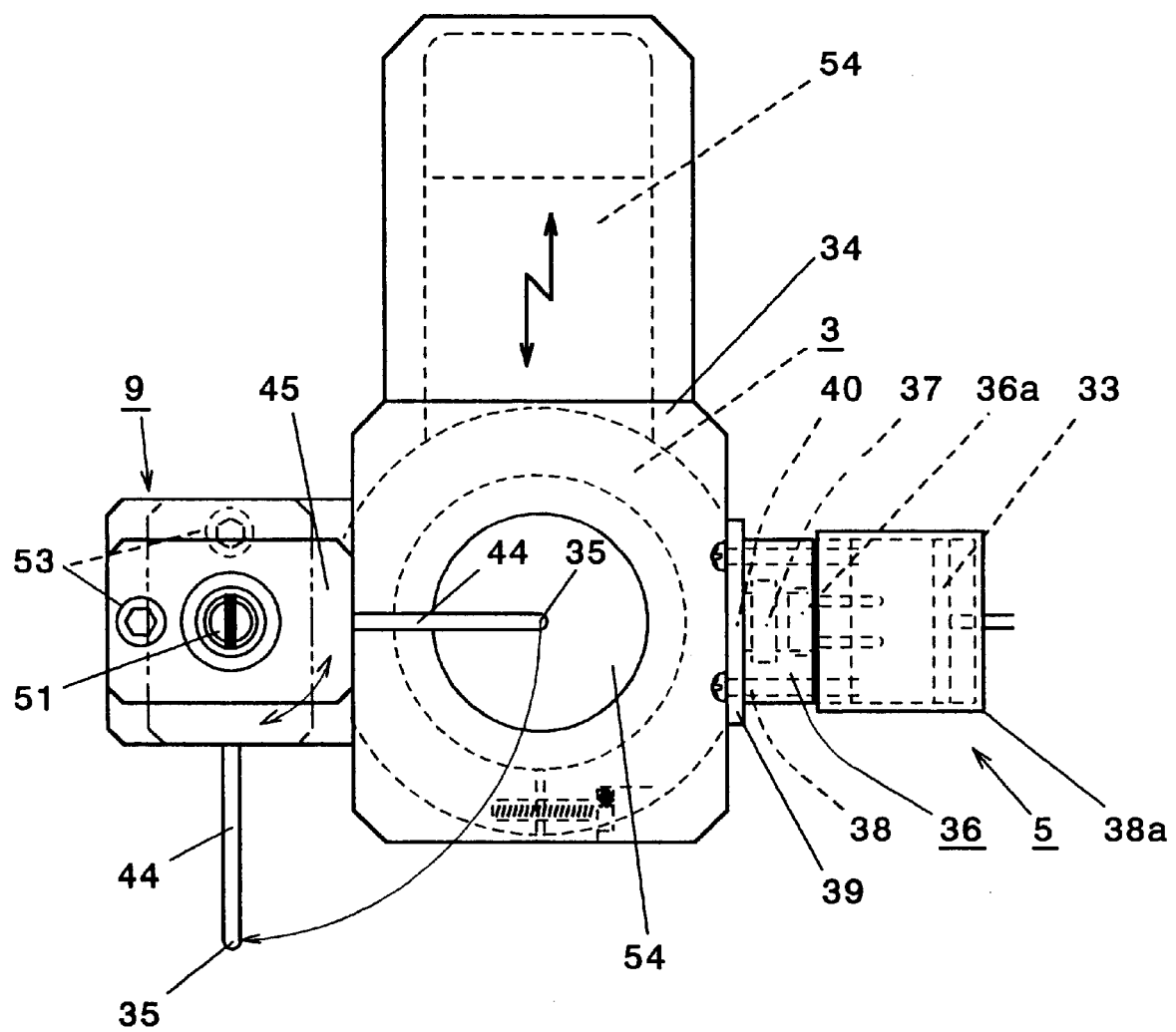
FIG. 7 is a bottom view of the laser beam projector shown in FIG. 6.

FIGS. 6 and 7 illustrate a modification of the second embodiment. A rotation shaft 51 is threadingly engaged with the holder 50 fixed to the laser beam projector 3, and the mirror holder 45 is rotatably attached to the rotation shaft 51 via a bearing 52. The reflector member 44 is attached to a side of the mirror holder 45 to be opposed to the laser beam 4 in alignment with the optical axis of the light sampling port 40. The holder 52 is formed with a positioning hole 53a, and the mirror holder 45 is formed with a through-hole 53b. A positioning pin 53 is inserted into the positioning hole 53a aligned with the through-hole 53b. Thus, the reflector member 44 can be fixed so that the axis of the light reflected on the reflector member 44 coincides with the optical axis of the light sampling port 40.

Upon withdrawal of the positioning pin 53, the mirror holder 45 can be rotated about the rotation shaft 51, permitting the reflector member 44 to be moved away from the laser beam 4.

The depth of insertion of the reflector member 44 into the laser beam 4 can be adjusted by changing the depth of insertion of the reflector member 44 into a holder hole 44a formed in the mirror holder 45. The reflector member 44 is fixed in the holder hole 44a by a set screw.

Thus, the reflector member 44 is fixed in a properly adjusted position. When the laser beam 4 is projected in this state, a very small fraction of the convergent portion 4a of the laser beam 4 or a fraction of the non-convergent portion 4b of the laser beam 4 impinges on the reflector surface 35 of the reflector member 44 thereby to be reflected toward the light sampling port 40. Thus, the laser beam fraction is taken into the laser output detector 5 from the light sampling port 40 for sampling thereof. As described above, the conversion device 36a converts the sampled laser beam fraction into an electrical signal, and outputs the electrical signal. The energy intensity of the projected laser beam 4 is computed on the basis of the outputted electrical signal by the detection circuit 33, and displayed on the display unit 5a. The computed energy intensity is typically displayed in numeric representation, but may be displayed in any proper form such as a bar chart or a pie chart. It is noted that FIG. 6 shows a case where a fraction of the non-convergent portion 4b is sampled.

Although the nozzle 41 is absent in FIG. 6, the nozzle 41 may be provided. Further, the purging may be employed as required. In this case, the purge gas is allowed to slowly flow out to cover a portion of the work piece 2 being machined.

Figure 8:
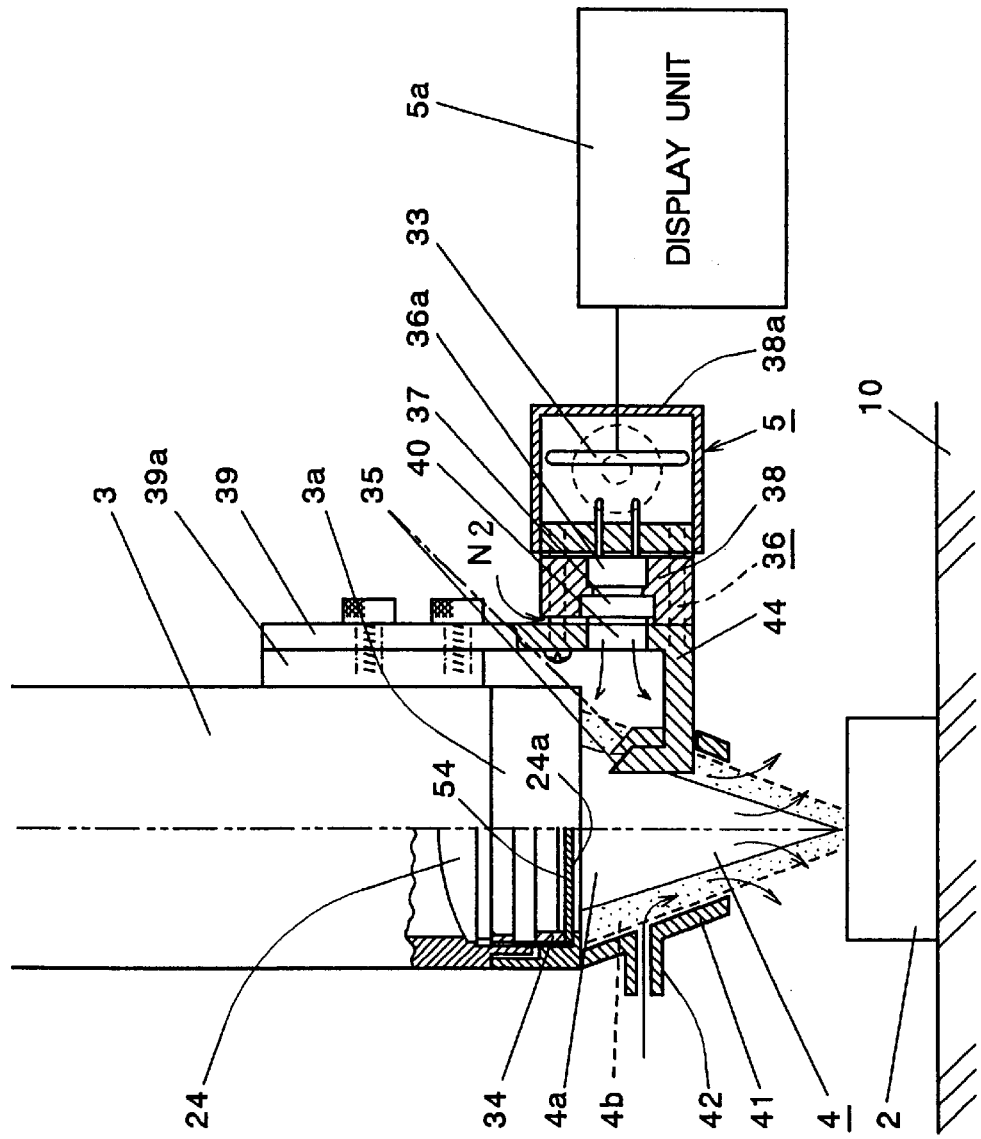
FIG. 8 is a partially cutaway side view illustrating another modification of the laser beam projector of the second embodiment.

FIG. 8 illustrates another modification of the second embodiment. The laser output detector 5 includes the reflector member 44 as a separate member or an integral member which is located so that the axis of the light reflected on the reflector member 44 coincides with the optical axis of the light sampling port 40 of the laser output detector 5 fixed to the holder 39. In this case, the depth adjustment is achieved by changing the thickness of a spacer 39a interposed between the holder 39 and the laser output detector 3. For the depth adjustment, the handle 47 may be provided for moving the holder 39, as in the first arrangement of the second embodiment.

Although the nozzle 41 is present in FIG. 8, the nozzle 41 may be removed. Further, the purging may be employed as required. In this case, the purge gas is allowed to slowly flow out to cover a portion of the work piece 2 being machined.

Thus, the reflector member 44 is fixed in a properly adjusted position. When the laser beam 4 is projected in this state, a very small fraction of the convergent portion 4a of the laser beam 4 or a fraction of the non-convergent portion 4b of the laser beam 4 impinges on the reflection surface 35 of the reflector member 44 thereby to be reflected toward the light sampling port 40. Thus, the laser beam fraction is taken into the laser output detector 5 for sampling thereof. As described above, the conversion device 36a converts the sampled laser beam fraction into an electrical signal, and outputs the electrical signal. The energy intensity of the projected laser beam 4 is computed on the basis of the outputted electrical signal by the detection circuit 33, and displayed on the display unit 5a. The computed energy intensity is typically displayed in numeric representation, but may be displayed in any proper form such as a bar chart or a pie chart. It is noted that FIG. 8 shows a case where a fraction of the non-convergent portion 4b is sampled.

Figure 9:
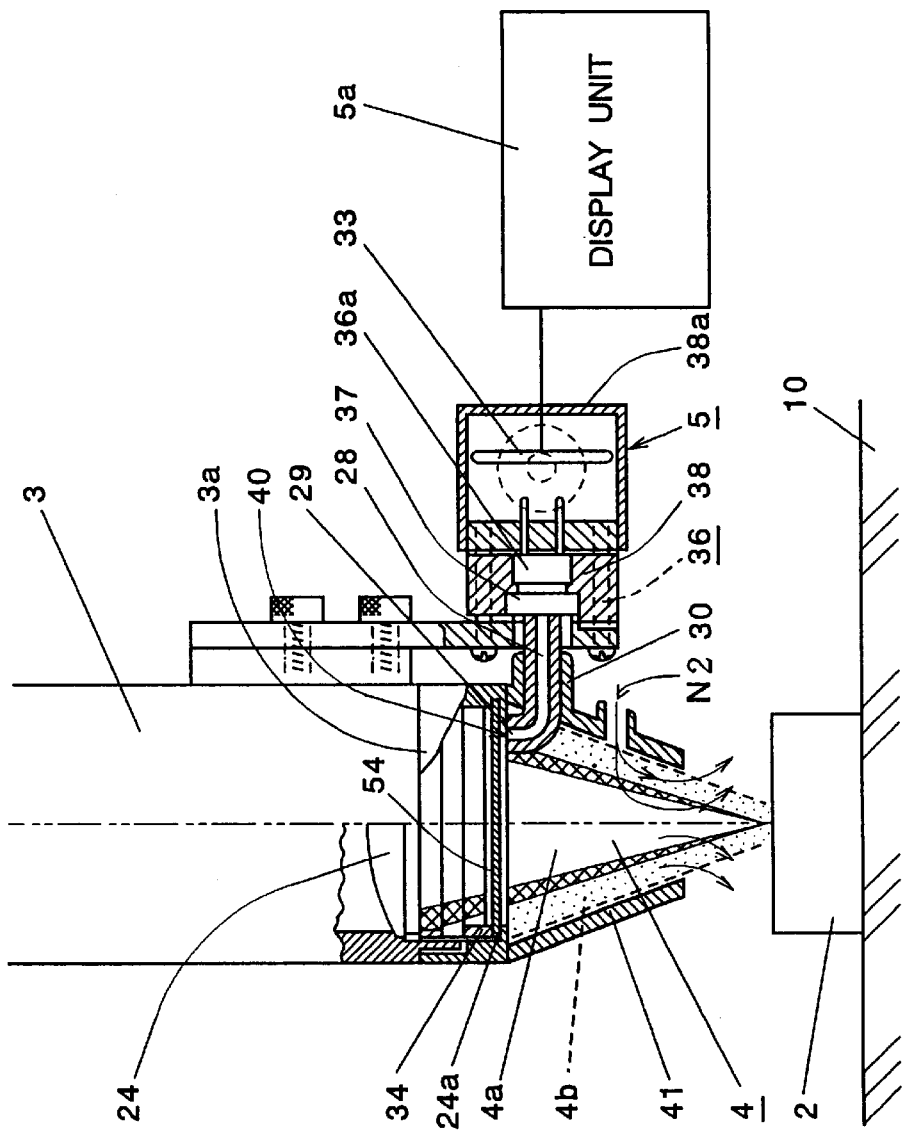
FIG. 9 is a partially cutaway side view of a laser beam projector according to a third embodiment of the present invention.

With reference to FIG. 9, there will next be described a third embodiment which employs the sampling method (3) using the optical fiber 28. The optical fiber 28 extends through a protective tube 30 inserted in the cover 38 and the nozzle 41. The optical fiber 28 has an incident surface 29 which faces the objective side of the laser beam projector 3. A very small fraction of the convergent portion 4a of the laser beam 4 or a fraction of the non-convergent portion 4b of the laser beam 4 is transmitted through the optical fiber 28 to the conversion device 36a for sampling thereof. The conversion device 36a converts the transmitted laser beam fraction into an electrical signal, and outputs the electrical signal. The energy intensity of the laser beam 4 is computed on the basis of the outputted electrical signal by the detection circuit 33, and displayed on the display unit 5a. The computed energy intensity is typically displayed in numeric representation, but may be displayed in any proper form such as a bar chart or a pie chart. It is noted that FIG. 9 shows a case where a fraction of the non-convergent portion 4b is sampled. The sampling position can be adjusted simply by changing the depth of the insertion of the protective tube 30 into the nozzle 41.

The incident surface 29 is disposed in contact with or in close proximity to the objective surface 24a (the lower surface of the protective glass 54) of the laser beam projector 3. This prevents the metal fume deposition on the incident surface 29 which may otherwise occur when metal fume evolves during the projection of the laser beam 4 onto the machining surface of the work piece 2. Thus, stable laser output detection can be ensured.

In this embodiment, there is provided the nozzle 41 into which the purge gas is supplied. The supply of the purge gas more effectively prevents the deposition of the metal fume on the incident surface 29.

Figure 10:
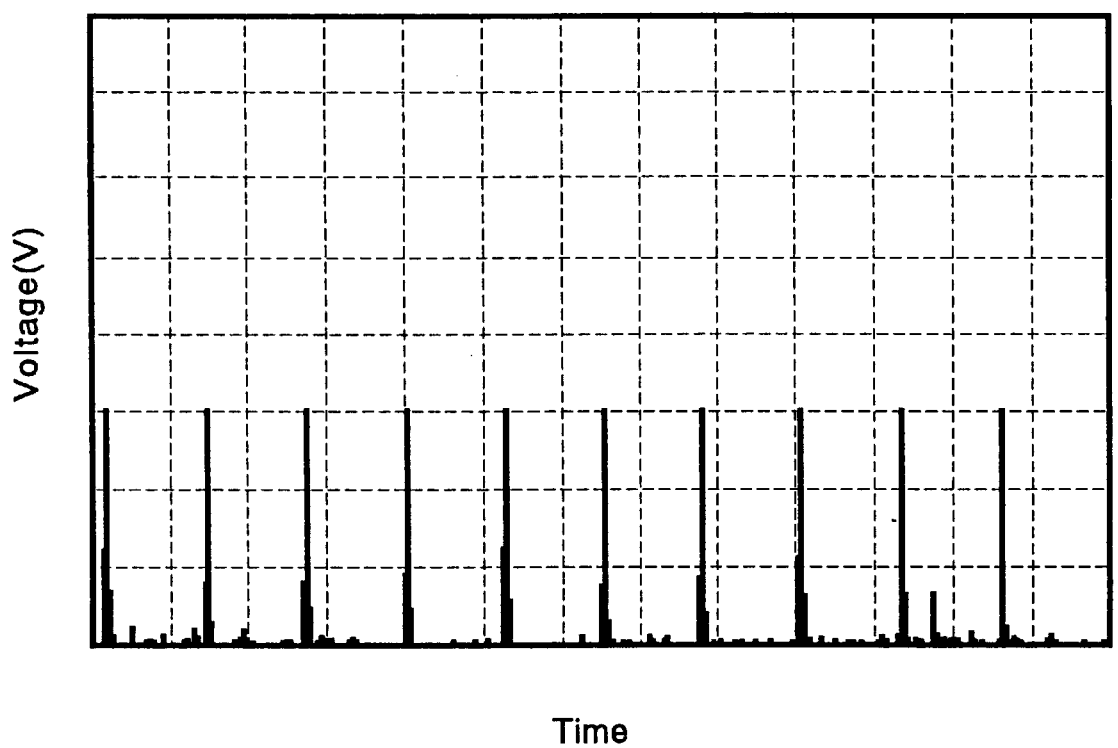
FIG. 10 is a display image showing a series of laser shots in accordance with the present invention.

FIGS. 10 to 15 show exemplary display images on the display unit 5a. Particularly, FIG. 10 shows a graph displayed on the display unit 5a when the laser output was measured by means of the laser output detector 5 for every shot of the laser beam 4 at a lamp voltage of 500V. In FIG. 10, the ordinate and the abscissa represent the voltage and the time, respectively. The laser shots occurred at time intervals of about $5 \times 10^{-2}$ sec, and the peak voltage was 3.42 volts. In comparison, the peak voltages at the respective laser shots were generally constant with the same peak height. This indicates that the laser output was detected with a high reproducibility.

Figure 11:
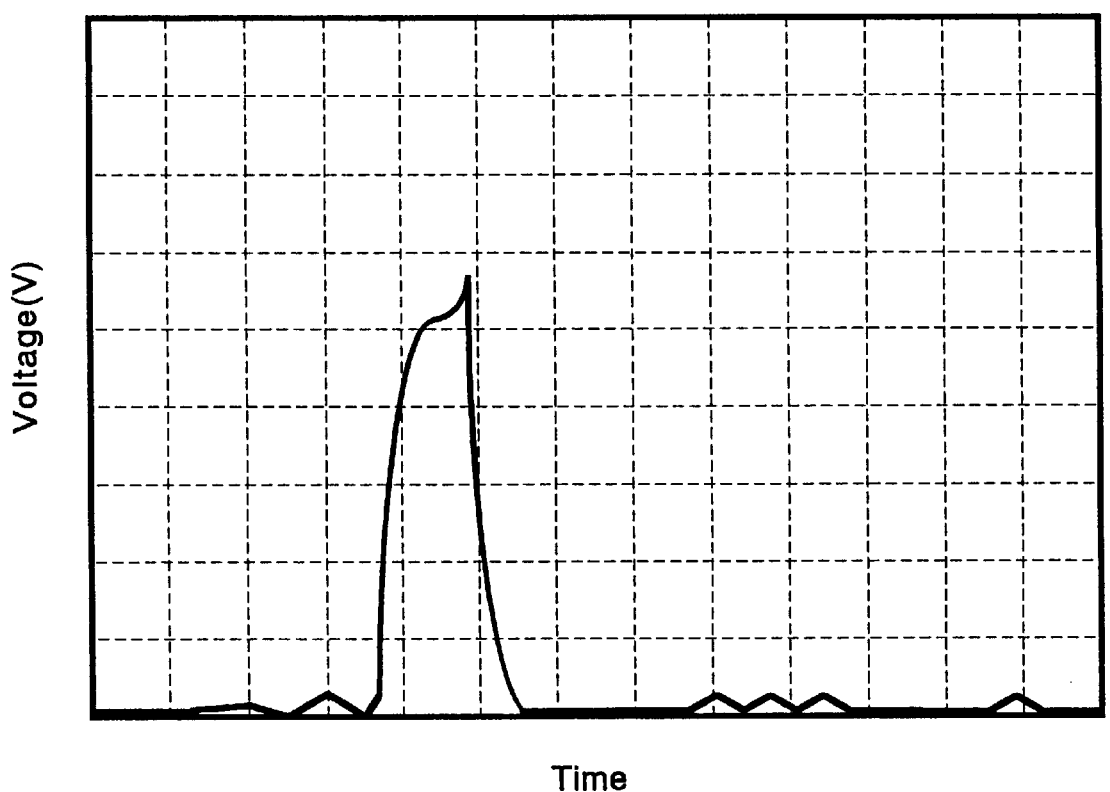
FIG. 11 is a display image showing the profile of a peak at one laser shot in FIG. 10 on an enlarged scale.

FIG. 11 is a display image showing the profile a peak at one laser shot in FIG. 10 on an enlarged scale. The energy amount of the laser beam 4 at one shot can be determined by calculating the area of the peak. The calculation may be based on any peak observed during the series of the laser shots. In this case, the average heat amount (Pj) (unit:joule) was 0.48 J, and the peak power (Wp) was 1.39 kW.

Figure 12:
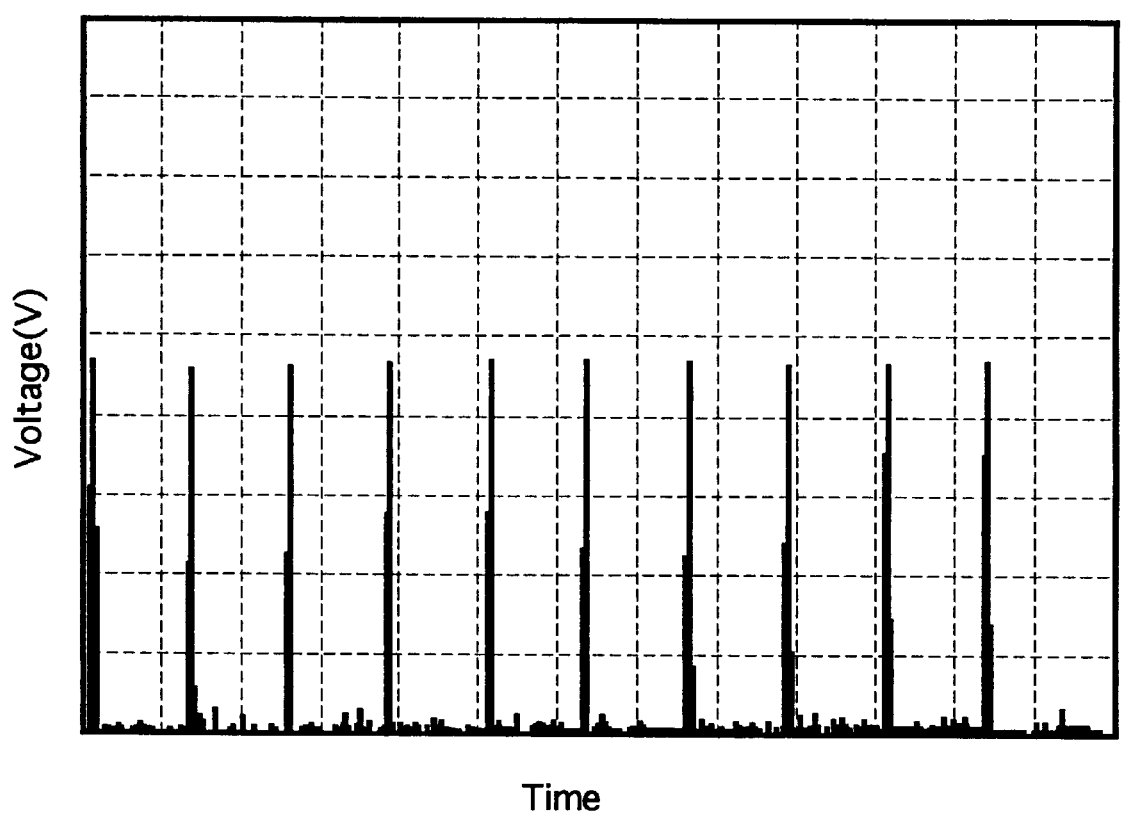
FIG. 12 is a display image showing another series of laser shots in accordance with the present invention.

FIG. 12 is a graph displayed on the display unit 5a when the laser output was measured by means of the laser output detector 5 for every shot of the laser beam 4 at a lamp voltage of 700V. The peak voltage was 5.80V. In this case, the laser output was detected with a higher reproducibility than in the case shown in FIG. 10.

Figure 13:
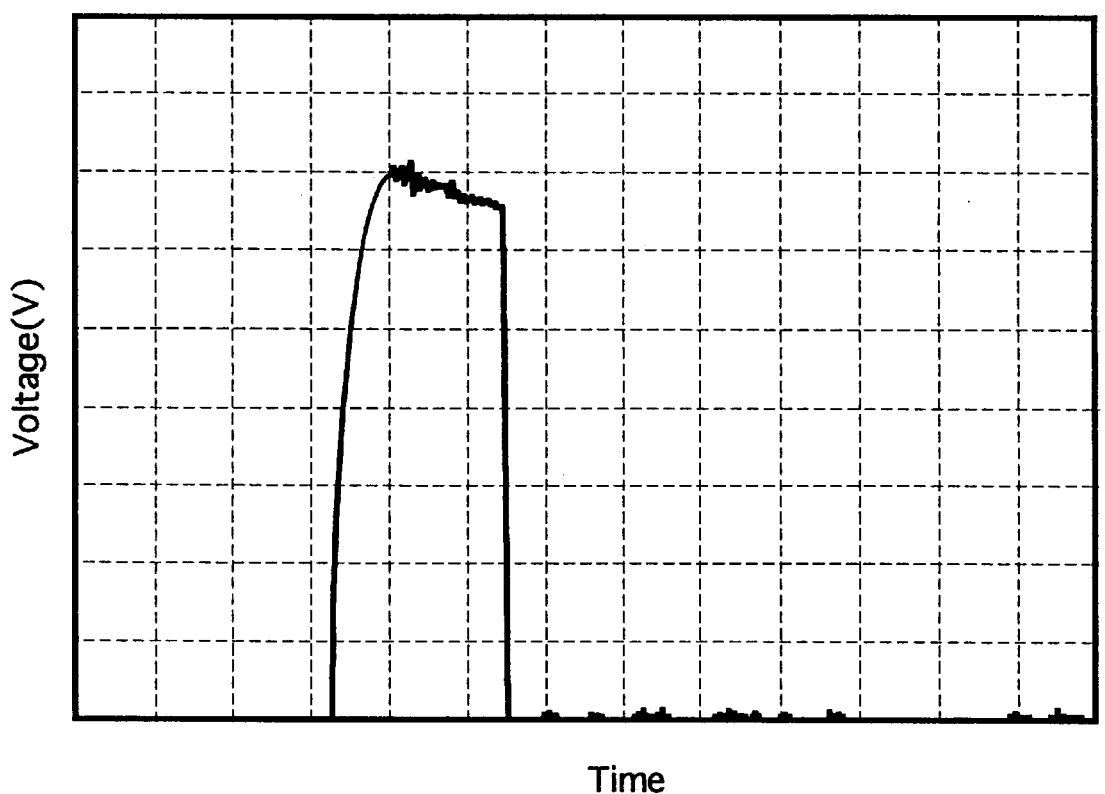
FIG. 13 is a display image showing the profile of a peak at one laser shot in FIG. 12 on an enlarged scale; A

FIG. 13 is a display image showing the profile of a peak at one laser shot in FIG. 12 on an enlarged scale. In this case, the average heat amount (unit:joule) was 17.79 J, and the peak power was 5.14 kW.

FIG. 15 is a graph showing a comparison between the laser output detected by the monitor M of the laser machining apparatus A and the laser output detected by the laser output detector 5 of the present invention for 20 laser shots. In these line charts, the laser output levels change in substantially the same manner with a deviation of about 2%. This indicates that the laser output detector 5 of the present invention is applicable for practical use.

A feed back control of the laser machining apparatus A according to the present invention will next be described briefly. The feed back control can optionally be employed in combination of any laser output detector, but is herein employed in combination with the laser output detector 5. Referring to FIG. 1, the laser output of the laser unit 6 is detected immediately downstream of the shutter 13 by means of the monitor M of the laser machining apparatus A. The laser output thus detected is compared with the laser output detected by the laser output detector 5 of the present invention, and a difference therebetween is outputted into the CPU 27. The feed back control is performed so that the laser output detected by the monitor M is equated with the laser output detected by the laser output detector 5. Thus, stable laser output can easily be ensured.

Further, the laser output control can be performed with the use of the pattern recognition device 1. This laser output control may optionally be employed, like the aforesaid feed back control. In the laser output control, the work piece 2 is set in the laser machining apparatus A, and the pattern recognition device 1 is operated for recognition of a surface pattern of the work piece 2. The recognized surface pattern image is converted into digital signals, which are taken into the control unit (CONT). The control unit (CONT) determines the X-Y coordinates (or polar coordinates) of a machining position P with respect to a reference position O, and the work piece 2 or the laser beam projector 3 is moved by actuating mover means 10 so that a laser projecting position coincides with the machining position P.

Upon coincidence of the laser projecting position with the machining position P, the laser unit 6 is actuated to emit a laser beam 4. The emitted laser beam 4 is precisely directed to the machining position P, which is intensely heated for a predetermined machining operation such as welding, boring or engraving. Upon completion of the laser machining, the pattern recognition device 1 is actuated again, and compares an image 2a of a portion of the work piece 2 at the machining position P with a reference laser machining pattern previously inputted into the control unit (CONT). The control unit (CONT) judges whether or not the recognized laser-machined pattern 2a matches the reference laser machining pattern within an allowable deviation. If the patterns are matched with each other within the allowable deviation, the laser machining is completed, and the mover means 10 is actuated to move the work piece 2 or the laser beam projector 3 so that the laser projecting position coincides with the next machining position. On the contrary, if the patterns are not matched with each other within the allowable deviation, the laser unit 6 is actuated again for laser re-machining. The laser machining is repeated until the resulting pattern matches the reference laser machining pattern within the allowable deviation. Thus, a machining failure can be prevented, so that a higher yield is ensured.

The laser output detector 5 is periodically calibrated manually or automatically with the use of a reference detector, for example, the conventional water-cooled laser output measuring device or a dry-type calibrator 60. The dry-type calibrator 60 will briefly be described.

The dry-type calibrator 60 includes a total reflection mirror 61 to be disposed as being inclined with respect to the objective surface 24a of the laser beam projector 3, a positioning plate 62 disposed below the total reflection mirror 61 for aligning the optical axis of the dry-type calibrator 60 by utilizing the light emitted from the He-Ne laser 17, a converging lens system 63 disposed below the positioning plate 62, and a conversion device 64 such as a PIN photodiode disposed below the converging lens system 63 for converting the light into an electrical signal.

The laser beam 4 projected from the objective surface 24a of the laser beam projector 3 for the calibration is incident on the total reflection mirror 61. While about 99% of the incident light is transversely reflected on the total reflection mirror 61, the remaining 1% thereof is transmitted through the total reflection mirror 61 to reach the conversion device 64. The conversion device 64 converts the transmitted light (1% of the incident light) into an electrical signal, which is used for accurate calculation of the energy amount of the outputted laser beam 4. On the basis of the accurate calculation data, the laser output detector of the present invention is automatically calibrated. The energy amount of the transmitted light corresponding to 1% of the incident light is linearly proportional to the total energy amount of the projected laser beam.

In accordance with the present invention, the laser output detector is adapted to sample a fraction of a convergent portion of a laser beam projected from the laser beam projector or a fraction of a non-convergent portion of the laser beam outside the convergent portion of the laser beam, convert the sampled laser beam fraction into an electrical signal, and compute the energy amount of the laser beam projected from the laser beam projector on the basis of the electrical signal. Therefore, the energy amount of the projected laser beam can be measured on a real time basis for every laser shot. The detected energy amount is displayed on the display unit, so that an operator can visually check the laser output for easy laser output management.

Since the laser beam fraction is sampled from the periphery of the laser beam or the non-convergent portion of the laser beam, energy loss can be prevented.

Where the reflector member is movably provided for the laser beam sampling, the reflector member can be located in an optimum position to sample a desired amount of laser beam.

Where the optical fiber is employed for the laser beam sampling, a greater flexibility can be provided for selection of the installation position of the laser output detector.

What is claimed is:

1. A laser output detector comprising:
   a. convertor unit having a light sampling port located adjacent a projecting portion of a laser beam projector and configured to sample one of a fraction of a convergent portion of a laser beam projected from the laser beam projector and a fraction of a non-convergent portion of the laser beam outside the convergent portion of the laser beam, and to convert the sampled laser beam fraction into an electrical signal; and a detection circuit configured to compute an energy amount of the projected laser beam on the basis of the electrical signal, which is outputted from the convertor unit.

2. A laser output detector comprising:
   a reflector member located adjacent a projecting portion of a laser beam projector and configured to reflect one of a fraction of a convergent portion of a laser beam projected from the laser beam projector and a fraction of a non-convergent portion of the laser beam outside the convergent portion of the laser beam for sampling thereof;

a convertor unit configured to input the laser beam fraction reflected from the reflector member and to convert the laser beam fraction into an electrical signal; and a detection circuit configured to compute an energy amount of the projected laser beam on the basis of the electrical signal which is outputted from the convertor unit.

3. A laser output detector comprising:
   an optical fiber having a light sampling end located adjacent a projecting portion of a laser beam projector and configured to transmit one of a fraction of a convergent portion of a laser beam projected from the laser beam projector or a fraction of a non-convergent portion of the laser beam outside the convergent portion of the laser beam for sampling thereof;

a convertor unit configured to input the laser beam fraction transmitted through the optical fiber and to convert the laser beam fraction into an electrical signal; and a detection circuit for computing an energy amount of the projected laser beam on the basis of the electrical signal which is outputted from the convertor unit.

4. A laser output detector as set forth in claim 2, further comprising a heater for heating the reflector member.

5. A laser output detector as set forth in claim 1, further comprising mover means for moving said output detector so that a laser beam sampling position can be changed.

6. A laser output detector as set forth in claim 2, further comprising mover means for moving the reflector member so that a laser beam sampling position can be changed.

7. A laser output detector as set forth in claim 3, further comprising mover means for moving the optical fiber so that a laser beam sampling position can be changed.

8. A laser output detector as set forth in claim 1, wherein a laser beam sampling position is surrounded with a nozzle, an inside of which is purged with a purge gas.

9. A laser output detector as set forth in claim 3, wherein the optical fiber is covered with a protective tube, and the light sampling end of the optical fiber is in contact with or in close proximity to an objective surface of the laser beam projector.

10. A laser output detector as set forth in claim 2, wherein a laser beam sampling position is surrounded with a nozzle, an inside of which is purged with a purge gas.

11. A laser output detector as set forth in claim 3, wherein a laser beam sampling position is surrounded with a nozzle, an inside of which is purged with a purge gas.

* * * * *